(No Model.) 9 Sheets—Sheet 1.
A. WRIGHTSON.
AUTOMATIC CIRCULAR KNITTING MACHINE.

No. 569,701. Patented Oct. 20, 1896.

(No Model.) 9 Sheets—Sheet 3.

A. WRIGHTSON
AUTOMATIC CIRCULAR KNITTING MACHINE.

No. 569,701. Patented Oct. 20, 1896.

INVENTOR:
Arthur Wrightson
by his Atty
Henry N. Paul Jr

WITNESSES:
J. E. Paige
James H. Bell

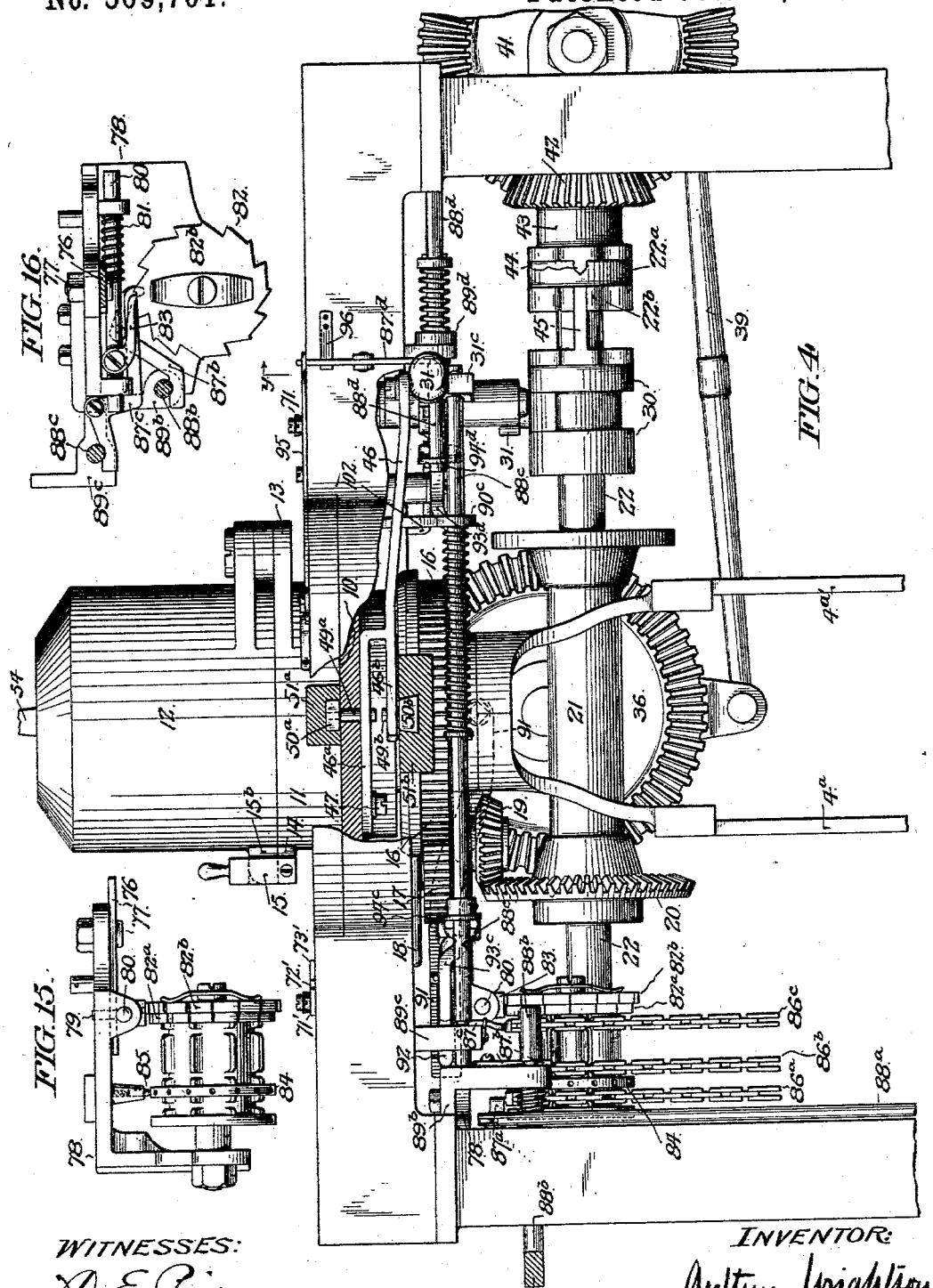

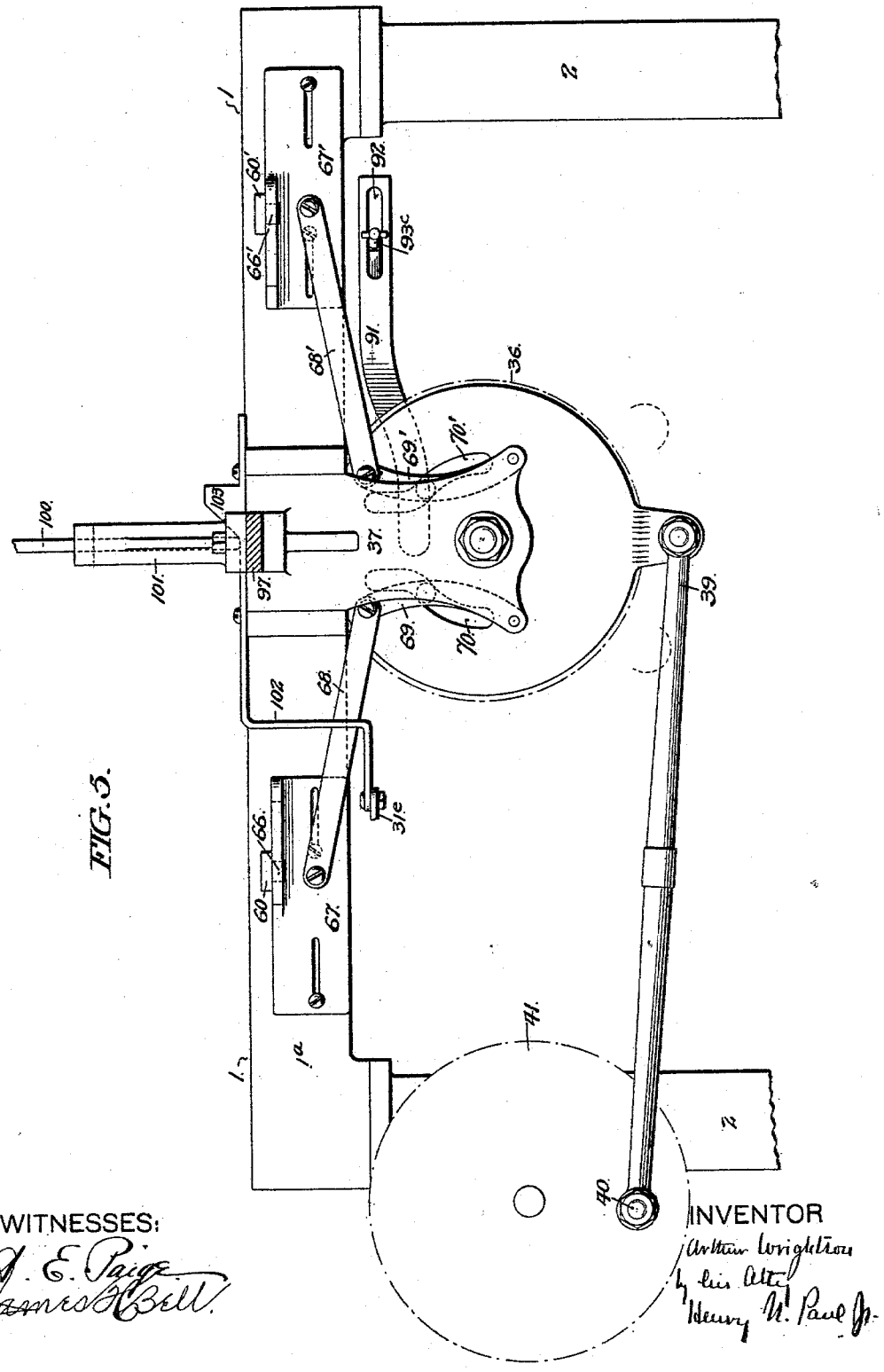

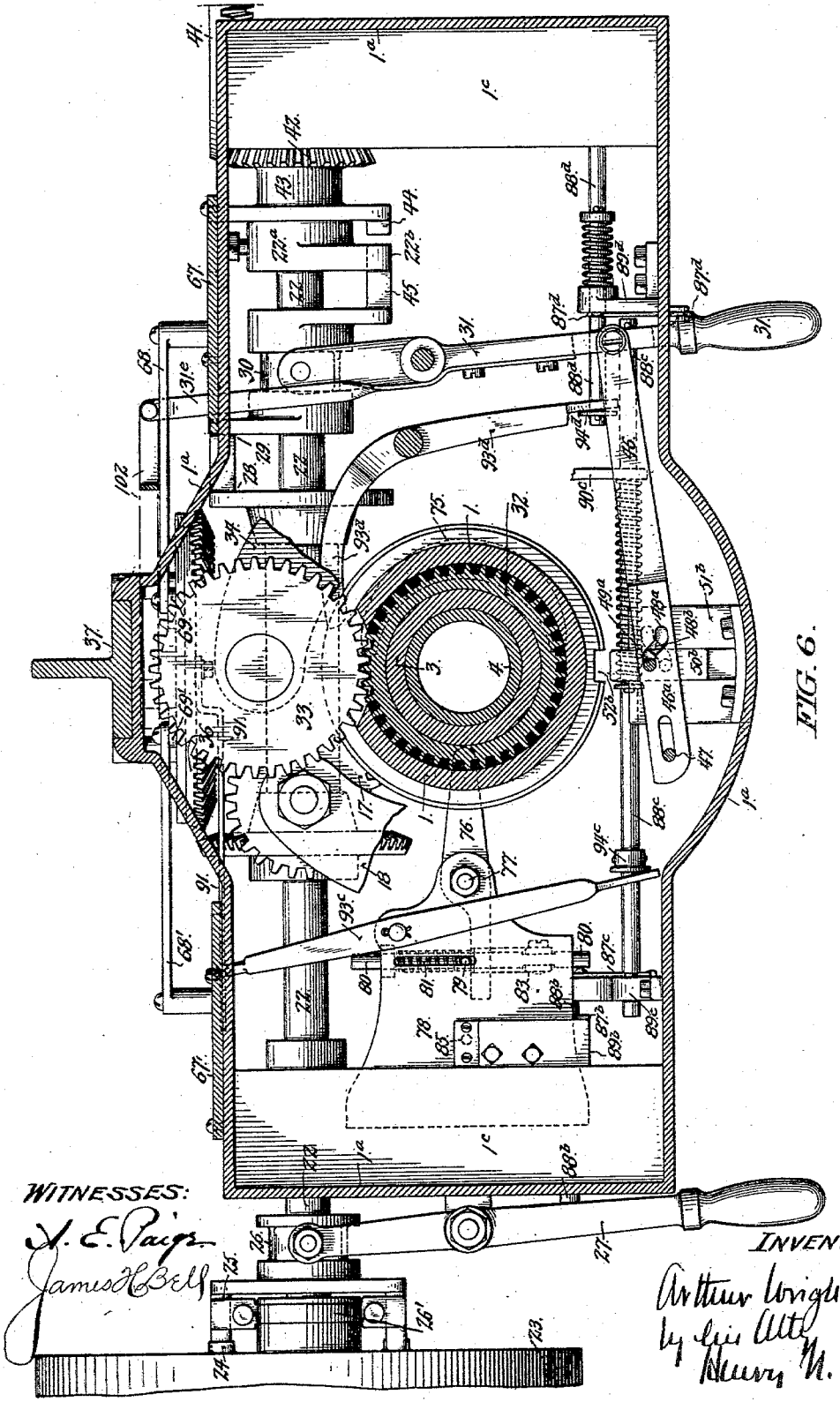

(No Model.) 9 Sheets—Sheet 7.
A. WRIGHTSON.
AUTOMATIC CIRCULAR KNITTING MACHINE.
No. 569,701. Patented Oct. 20, 1896.
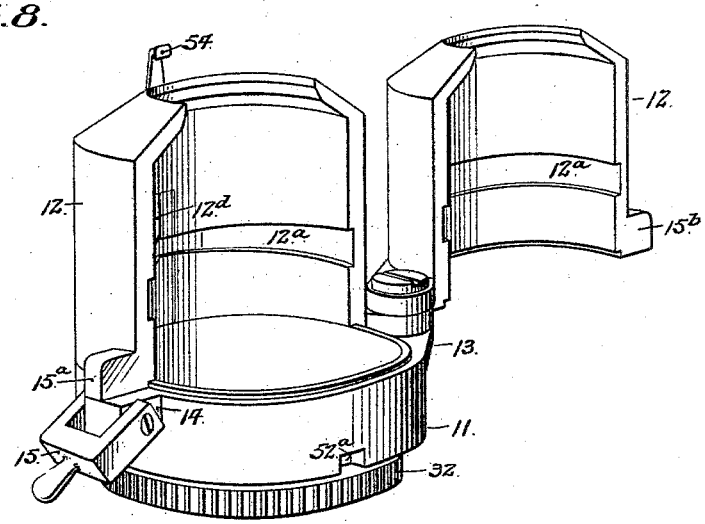
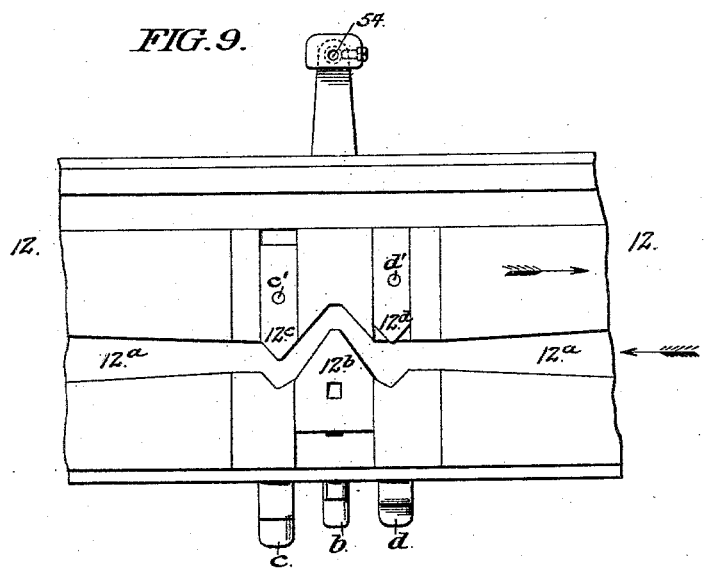
WITNESSES:
INVENTOR (No Model.) 9 Sheets—Sheet 8.

A. WRIGHTSON.
AUTOMATIC CIRCULAR KNITTING MACHINE.

No. 569,701. Patented Oct. 20, 1896.

WITNESSES:

INVENTOR (No Model.) 9 Sheets—Sheet 9.
A. WRIGHTSON.
AUTOMATIC CIRCULAR KNITTING MACHINE.
No. 569,701. Patented Oct. 20, 1896.
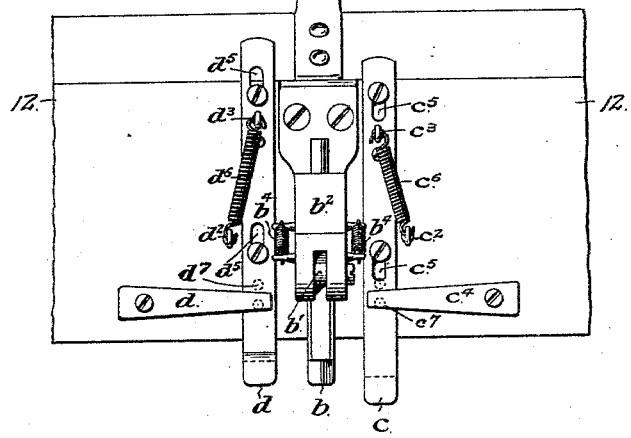
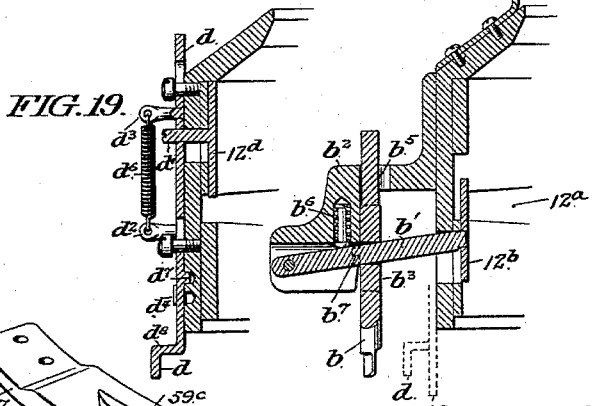
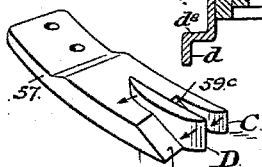
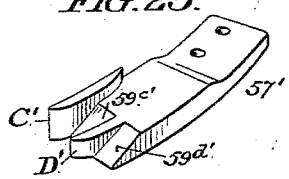
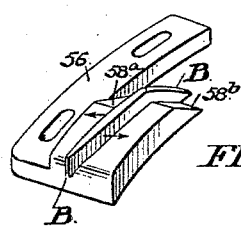
WITNESSES:
INVENTOR

United States Patent Office.

ARTHUR WRIGHTSON, OF PHILADELPHIA, PENNSYLVANIA.

AUTOMATIC CIRCULAR-KNITTING MACHINE.

SPECIFICATION forming part of Letters Patent No. 569,701, dated October 20, 1896.

Application filed September 22, 1894. Serial No. 523,784. (No model.)

*To all whom it may concern:*

Be it known that I, ARTHUR WRIGHTSON, a citizen of the United States, residing in the city of Philadelphia and State of Pennsylvania, have invented a certain new and useful Improved Automatic Circular-Knitting Machine, whereof the following is a specification, reference being had to the accompanying drawings.

My invention belongs to that class of circular-knitting machines for knitting stockings in which the main portion of the stocking is formed by a continuous rotary movement of the needle-cylinder and in which the heel and toe pockets are successively automatically formed by the rotation of the needle-cylinder giving place to a partial reciprocation of the cam-cylinder, whereby certain of the needles are successively thrown into and out of action, and relates specifically to certain features and construction of the machine fully described and claimed below.

Figure 1:
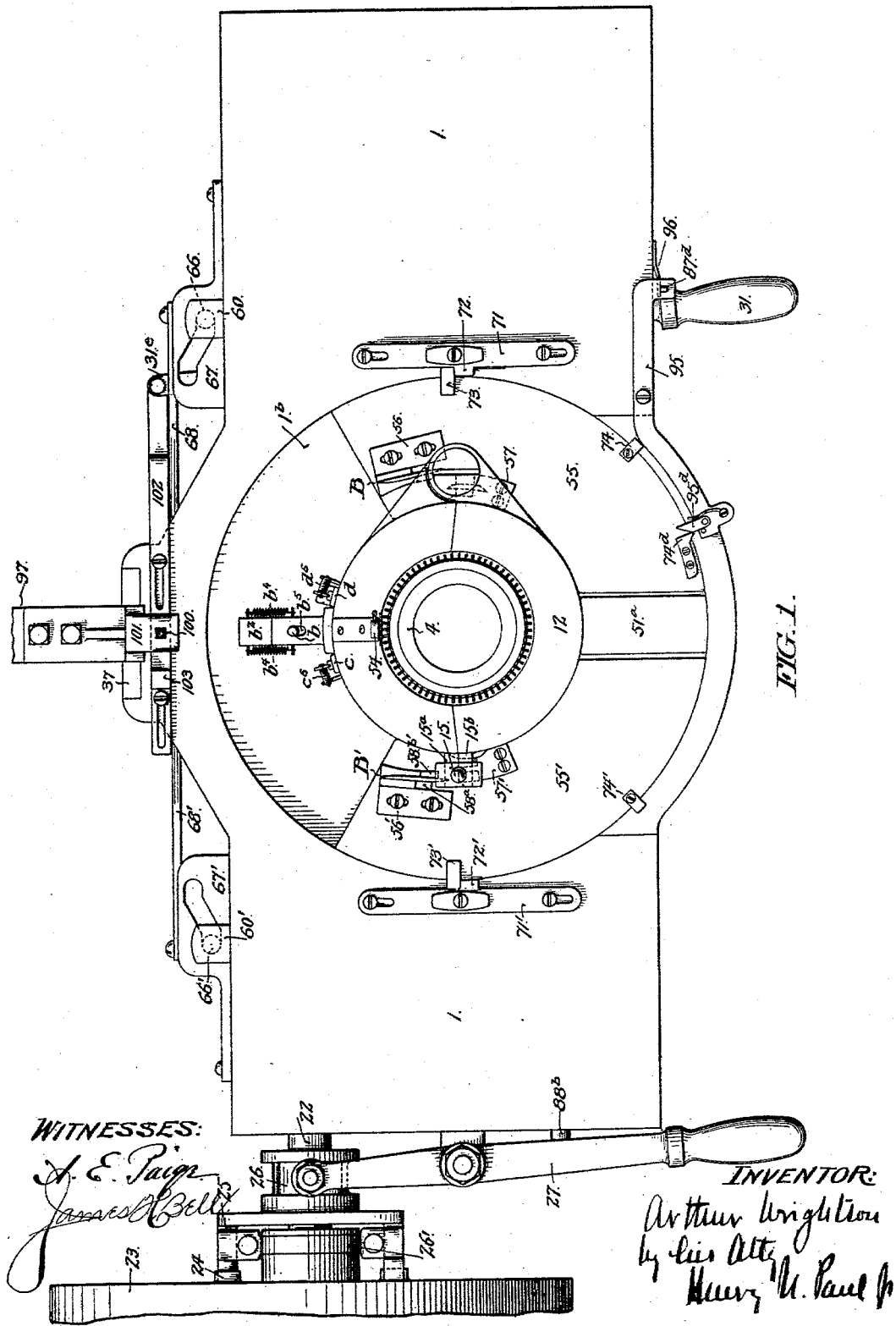
Figure 2:
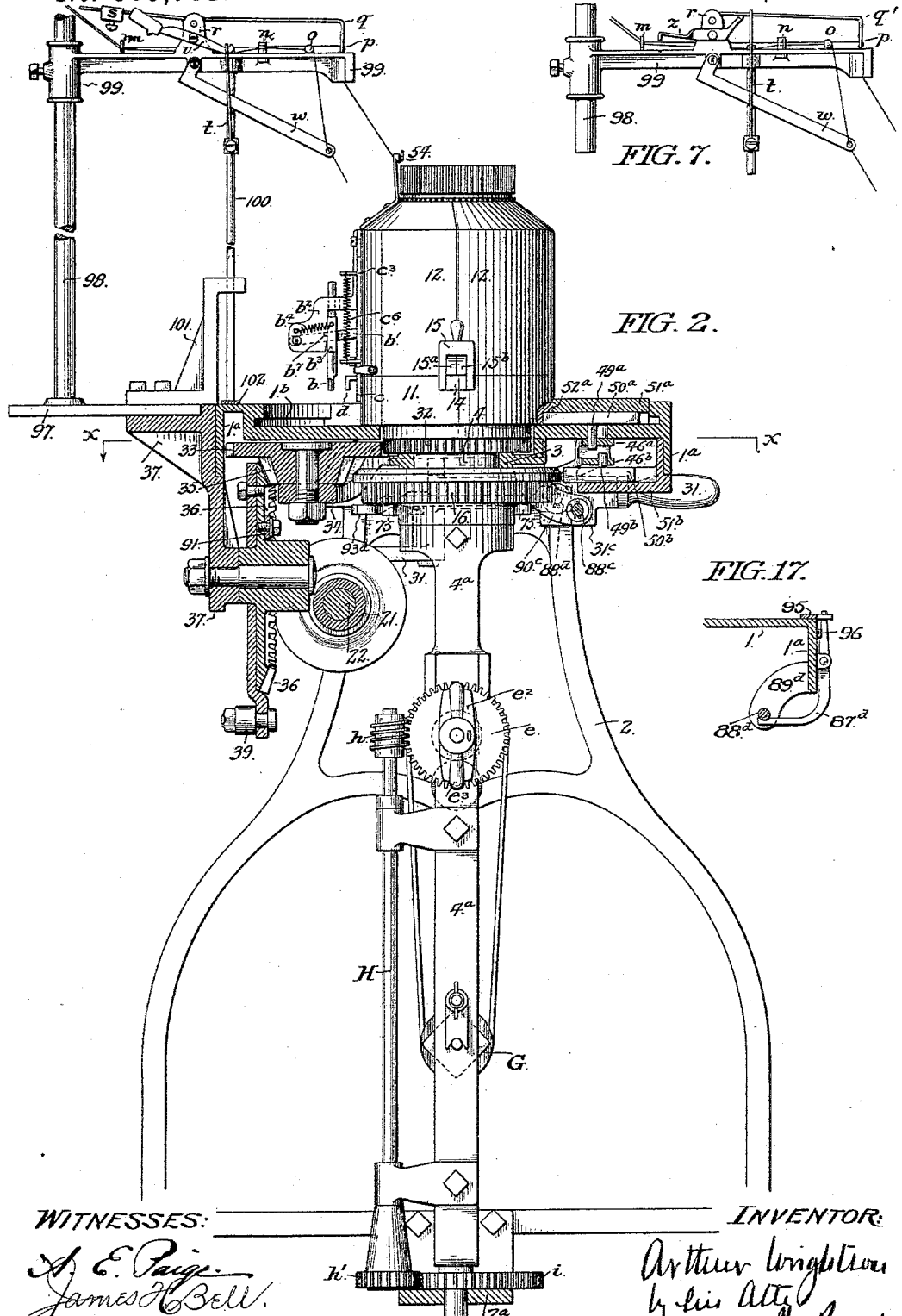
Figure 3:
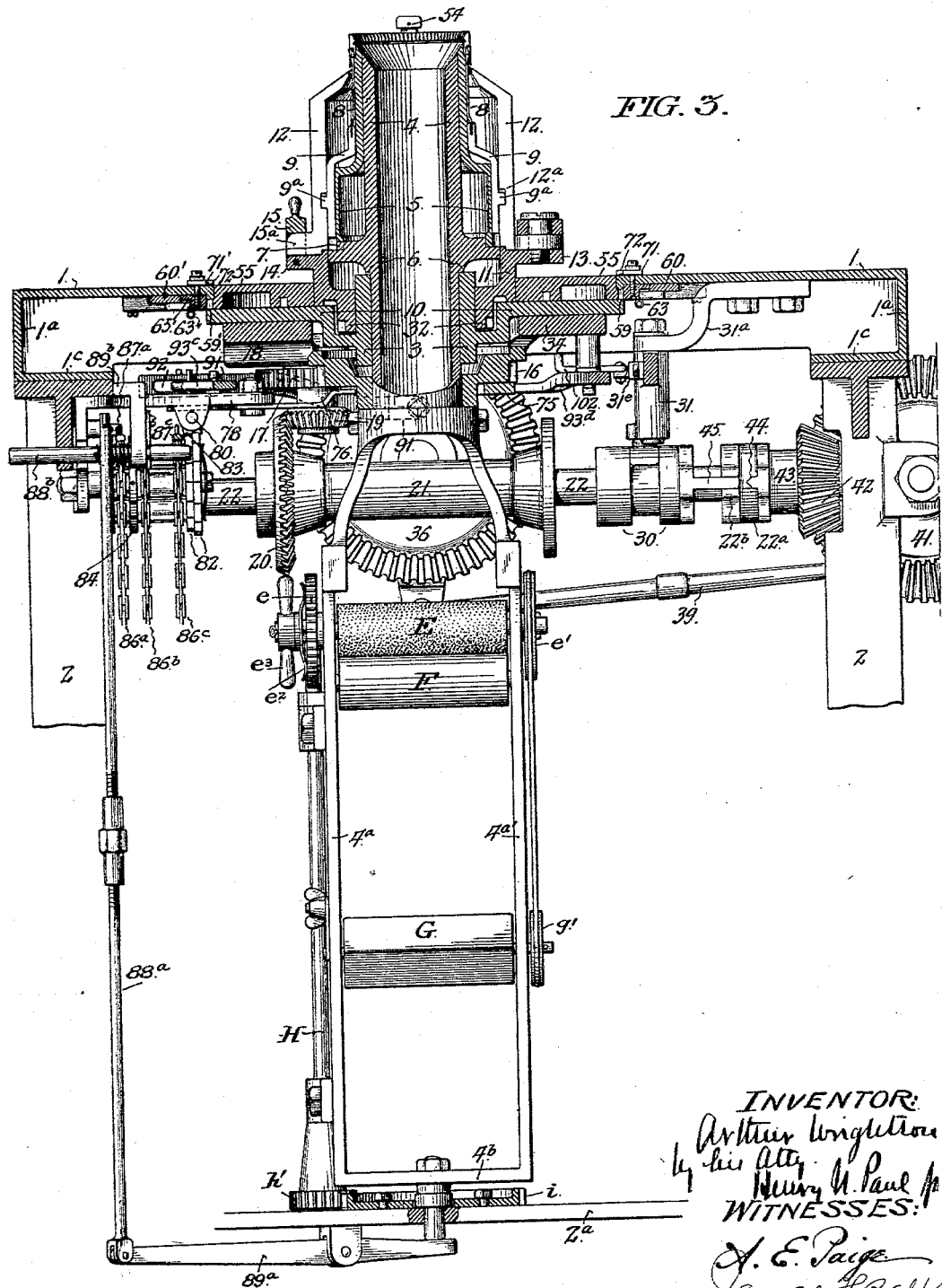
Figure 12:
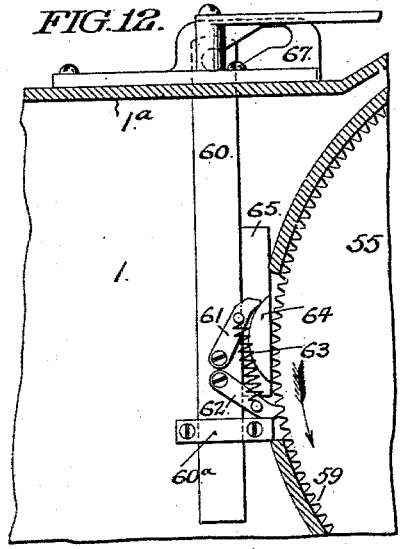
Figure 13:
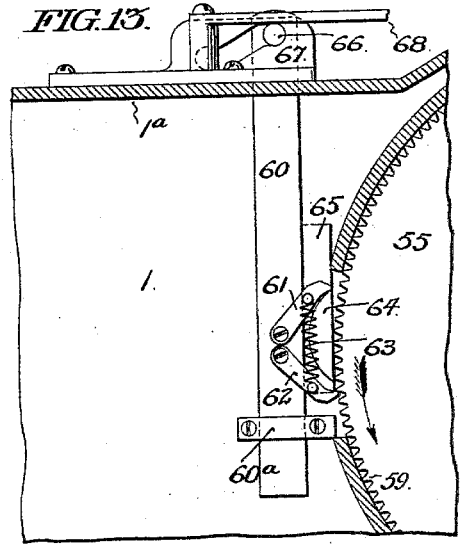
Figure 14:
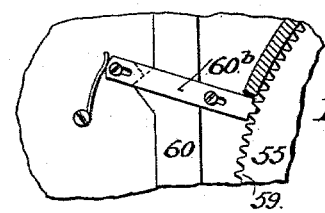

In the accompanying drawings, Figure 1 is a plan view of my machine, the thread-controller being removed. Fig. 2 is a central cross-section of the same, the thread-controller, cam-cylinder, stem, and accompanying parts being shown in elevation. Fig. 3 is a central longitudinal section of the same, certain details being also shown in elevation. Fig. 4 is a front elevation of the machine with a portion of the table broken away and the needle-cylinder removed. Fig. 5 is a rear elevation of the machine with certain parts fully shown in the other drawings omitted or merely indicated for the sake of simplification. Fig. 6 is a horizontal section of the machine through the line $x\,x$, Fig. 2. Fig. 7 shows an alternative construction of the thread-controller. Fig. 8 is a detail view of the cam-cylinder with its base-ring. Fig. 9 is an enlarged elevation of that portion of the interior of the cam-cylinder which contains the cams developed upon a plane. Figs. 10, 11, 12, and 13 are inverted sectional plan views of the right-hand portion of Fig. 1, showing the racking mechanism in detail. Fig. 14 is a similar view of an alternative construction of a portion of the same. Figs. 15 and 16 are detail views, respectively, in front and side elevation of the pattern-chain-driving mechanism with the supports and accompanying parts. Fig. 17 shows in detail the locking-lever $87^d$, the section along which the view is taken being indicated by the line $y$, Fig. 4. Fig. 18 is an enlarged elevation of that portion of the exterior of the cam-cylinder which carries the sliding cam-rods, developed upon a plane. Fig. 19 is a vertical section of the same through the center of the rod $d$. Fig. 20 is a vertical section of the same through the center of the rod $b$. Figs. 21, 22, and 23 are respectively detail views in perspective of the cam-plates 56, 57, and 57'.

Similar figures and letters refer to similar parts throughout the several views.

1 is the bed-plate or table of the machine. It has a depending rim $1^a$ all around its edge, to which many of the bearings hereinafter referred to are bracketed. At both ends the lower edges of this rim are united by a web $1^c$, beneath which are affixed the supporting-standards 2, consisting of uprights and cross-pieces. Directly in the center of the table is a large circular recess $1^b$. Within the center of this recess is formed a vertical bearing 3, within which revolves the stem 4. The lower end of this stem, which is a long hollow cylinder down the center of which the stocking-tube passes, expands and divides into two forks $4^a\,4^{a'}$, united at their bottom by a cross-piece $4^b$, forming a rectangular frame within which is carried the mechanism for taking up the work, which will be hereinafter described. From the center of the cross-piece, which forms the bottom of this frame, there projects downwardly a vertical pivot revolving in a suitable bearing in a cross-piece $2^a$, which unites the opposite standards near their feet. Slightly above the level of the surface of the table a flange 6 is formed upon the stem. The lower side of this flange forms a shoulder, which rests upon the upper edge of the bearing 3. The outer edge of the upper side of the flange is formed with an annular groove within which the expanded lower edge of the needle-cylinder 5 rests without being fastened thereto. A small lug 7 in one portion of the groove fits into a corresponding slot in the edge of the needle-cylinder, and thus insures the simultaneous revolution of the two. The expanded lower portion of the needle-cylinder is of greater diameter than the upper portion, which fits tightly around the upper end of the stem, but may be slid upwardly off the stem with the utmost readiness. The needles 8, sliding in suitable needle-grooves, are mounted upon needle-jacks 9, which have shoulders corresponding to the varying diameter of the needle-cylinder, and from the backs of these needle-jacks project the bits $9^a$, which are operated upon by the needle-cams, as hereinafter described.

A short distance outwardly from the bearing of the stem, and within the circular recess, the upper surface of the table forms an annular bearing 10, upon which rests and revolves the lower edge of the base-ring 11 of the cam-cylinder 12. The cam-cylinder is of the usual shape, but is split vertically into two substantially equal parts, both of which are hinged vertically at their corresponding lower corners upon an arm 13, projecting horizontally from the upper edge of the base-ring. The hinges, together with the pivotal screw of the same, are made large enough to secure perfect steadiness in the motion and fitting of the halves of the cam-cylinder. Opposite this hinging arm the upper edge of the base-ring carries a similar arm 14, to which is swiveled horizontally a fastening-yoke 15. The lower corners of the halves of the cam-cylinder, which meet above the arm 14 when the cylinder is closed, carry stout lugs $15^a$ $15^b$, which are caught firmly together when the fastening-yoke is raised to an upright position. By thus dividing the cam-cylinder it is easy at any time to swing back the halves and obtain access to the needles. It is also possible when the cam-cylinder is thus opened to slide the needle-cylinder off from its stem and remove it—a feature which is very desirable under all circumstances, but which is especially so in case what is termed "transfer-work" is being executed, in which case the needle-cylinder upon which a stocking-tube has been partially knit upon a machine forming one variety of stitch is removed and placed upon another machine which forms a different variety of stitch. As in all machines of this class the bits upon the needle-jacks are received within the customary annular cam-groove running around the interior of the cam-cylinder, this separation of the cam-cylinder and the needle-cylinder has always been a difficult and lengthy operation, which difficulty is effectually removed by the improvement which I have described.

It will be understood that, as in all machines of this class, the leg and foot of the stocking are formed by the continuous revolution of the needle-cylinder within the cam-cylinder when stationary, while the heel and toe pockets are successively formed by a partial reciprocation of the cam-cylinder around the needle-cylinder when stationary. The mechanism by which these motions are effected will now be successively described, and then, in order, the mechanism whereby the needle-cams are actuated, the mechanism whereby the narrowing and widening of the heel and toe pockets are effected, the mechanism for tightening or loosening the stitch, the mechanism for automatically exchanging the motion of revolution for that of reciprocation, and vice versa, the thread-controlling mechanism, the mechanism for taking up the work as it is completed, and the mechanism for automatically stopping the machine. In order to simplify this description, the method of operation of each one of these groups will be indicated in connection with or at the close of the description of the mechanism forming the group.

1. *The mechanism for effecting the revolution of the needle-cylinder.*—Upon the stem, immediately below the lower edge of the vertical bearing 3, there is formed a spur-wheel 16, which gears with a corresponding spur-wheel 17, pivoted beneath a curved horizontal bearing-arm 18, depending from the under surface of the table. Below this spur-wheel and integral with it is a bevel-wheel 19, gearing with a corresponding vertical bevel-wheel 20, mounted upon the left-hand extremity of a sleeve 21, freely surrounding the transverse driving-shaft 22, which runs the length of the machine and revolves in bearings affixed to the standards 2 2. The connection between the driving-shaft and the sleeve 21 is effected through the intervention of a lug 28, upon the right-hand extremity of the sleeve, engaging with a corresponding lug 29, which forms part of the left-hand member of the differential clutch 30, sliding longitudinally upon the shaft. The coincident revolution of the clutch-sleeve and the shaft is secured by the collar $22^a$, which is permanently affixed to the shaft by a set-screw, which carries a fork $22^b$ on one side engaging with the lug 45, which forms part of the right-hand member of the differential clutch. The movement of the clutch is controlled by a clutch-lever 31, intermediately pivoted to the horizontal arm $31^a$, depending from the under surface of the table. This lever has a handle upon its forward extremity by means of which the clutch may be voluntarily thrown at any time, and there is also provided mechanism, which will be hereinafter described, whereby it is automatically thrown at the proper time. When the clutch is thrown to the left by the motion of this lever, as seen in Fig. 6, it engages with the sleeve 21, and the shaft, being continuously driven from the pulley 23, imparts continuous revolution to this sleeve, from which, by the system of gearing which has been described, a continuous motion of revolution is imparted to the stem 4 and through it to the needle-cylinder.

2. *Mechanism for effecting the reciprocation of the cam-cylinder.*—Immediately surrounding the outside of the vertical bearing for the stem the base-ring of the cam-cylinder has a downwardly-projecting flange, for the reception of which an annular groove, still deeper than the recess which has already been spoken of, is formed in the surface of the table. This flange has formed upon it a spur-wheel 32. The side of the annular groove is cut away for a short distance immediately in the rear of the machine, and through the opening thus formed the spur-wheel 32 gears with a corresponding spur-wheel 33, pivoted upon a curved horizontal bearing-arm 34, depending from the under surface of the table. This latter spur-wheel is integral with a bevel-wheel 35 immediately below it, which gears with a corresponding vertical bevel-wheel 36, pivoted in the center of the rear of the table upon the forward side of a depending bearing-arm 37, projecting down from the rear edge of the table. This bevel-wheel 36 has bolted to its rear surface an arm projecting downwardly beyond the periphery of the wheel, and which has pivoted to it upon its lower end a pitman 39, the other extremity of which is pivoted to a crank-pin 40 upon a bevel-wheel 41, hung upon a stud projecting out from the standard at the right-hand end of the table. This bevel-wheel 41 gears with a corresponding bevel-wheel 42 upon the end of a sleeve 43, carrying a lug 44 for engagement with the lug 45, which forms part of the right-hand member of the differential clutch 30. When the clutch is thrown to the right by the motion of its controlling-lever, it engages with the sleeve 43 and imparts a continuous revolution to it, from which, by the system of gearing and connection which has been described, a continuous motion of reciprocation is imparted to the cam-cylinder. The cogs of the gearing are so adjusted that this reciprocation extends over an arc of somewhat more than one hundred and eighty degrees.

In order that while the revolution of the needle-cylinder is proceeding the cam-cylinder may be locked firmly in its position, and vice versa, an alternate locking mechanism is provided as follows: Near the forward end of the clutch-lever 31 is pivoted one extremity of the slide-rod 46. The other extremity of this slide-rod is forked vertically, as seen best in Fig. 4, and the upper and longer member $46^a$ is slotted longitudinally to receive the pin 47, projecting down from the lower surface of the table, whereby the movement of the slide-rod is guided. This upper member is also provided with a diagonal slot $48^a$, which receives the pin $49^a$, projecting down from the locking-bar $50^a$, which slides within a suitable slideway on the under side of the plate $51^a$, affixed to the forward part of the table within the annular recess. The locking-bar $50^a$ is therefore in the same plane as the lower edge of the downwardly-projecting flange of the base-ring of the cam-cylinder, which contains a suitable notch $52^a$ to receive the locking-bar $50^a$ when it is in its forward position. Similarly the lower member $46^b$ of the slide-rod is provided with a diagonal slot $48^b$, inclined in the opposite direction to the slot $48^a$, which receives the pin $49^b$, projecting up from the locking-bar $50^b$, which slides within a suitable slideway on the upper side of the plate $51^b$, bracketed from the depending rim of the table in the same plane as the projecting flange forming the upper portion of the spur-wheel 16, which flange contains a suitable notch $52^b$ to receive the locking-bar $50^b$ when it is in its forward position. Consequently when the clutch-lever 31 is in its right-hand position, as seen in Fig. 6, with the clutch engaging with the mechanism which effects the revolution of the needle-cylinder, the locking-bar $50^a$ is projected forward into the notch $52^a$, locking the cam-cylinder firmly in position, while the locking-bar $50^b$ is withdrawn from the notch $52^b$, leaving the stem and needle-cylinder free to revolve; and, similarly, when the clutch-lever is thrown in the opposite direction, releasing the mechanism which effects the revolution of the needle-cylinder and engaging the mechanism which effects the reciprocation of the cam-cylinder, the position of these locking-bars is reversed, leaving the cam-cylinder free to reciprocate, but locking the stem and needle-cylinder. This locking mechanism performs the additional important function of compelling the motions of revolution and reciprocation to come to a stop at a definite predetermined position, which position therefore affords the starting-point at which the motion is taken up again at the proper time. This position, in which the moving parts are brought to a rest by the insertion of the locking-bar within its notch, both in the case of the mechanism of revolution and the mechanism of reciprocation, will hereinafter, throughout this specification, be termed the "normal" position of these parts, and it is in this position that all of the parts are shown in the figures of the drawings.

3. *The mechanism for actuating the needle-cams.*—The bits $9^a$ of the needle-jacks 9 are received into an annular groove $12^a$, running around the interior of the cam-cylinder, which groove is interrupted at a point which is normally directly in the rear of the machine by three needle-cams, namely, a lifting-cam $12^b$ and two depressing-cams $12^c$ $12^d$, one on either side of the lifting-cam, by means of which the needles are controlled. These needle-cams are shown in Fig. 9 in their normal position, in which case the cam-cylinder is stationary and the needle-cylinder is revolving within it in the direction opposite to the hands of a watch, as indicated by the lower arrow, this being at all times the direction of the continuous revolution of the needle-cylinder. In this position the leading depressing-cam $12^d$ is up, that is, inactive, the lifting-cam is up, that is, active, and the following depressing-cam is down, that is, active. Consequently the revolution of the needle-cylinder within the cam-cylinder in the direction indicated causes each needle successively to pass without action the leading depressing-cam $12^d$, then to be advanced by the lifting-cam $12^b$, so as to slip its stitch and receive a new one from the thread which is fed continuously through the thread-guide 54, and then to be retracted by the following depressing-cam $12^c$, so as to draw its stitch in the manner well understood in the art, the effect of this motion of continuous revolution being to knit a continuous tube which falls down through the hollow stem and is wound up by the take-up mechanism, which will be hereinafter described. When, however, the needle-cylinder is stationary and the cam-cylinder reciprocates, the length of the arc of active reciprocation, as determined by the position of the cams to be hereinafter described, is such that the fashioning set of needles, that is, those which remain active, operate only upon a greater or less arc of the stocking-tube, forming a flap upon that side of the tube. The mechanism by which the fashioning set is first caused to grow smaller and then grow larger, so as to convert this flap into a pocket which forms the heel or toe of the stocking, will be hereinafter described. Under this heading that mechanism only is described by which the lifting-cam $12^b$ is rendered inactive at the point at each end of the reciprocation where the fashioning set ceases, and by which the depressing-cams $12^c$ and $12^d$ are caused to so alternate in position, as the cam-cylinder moves first in one direction and then in the other, that the leading depressing-cam is always up, that is, inactive, and the following depressing-cam always down, that is, active, so that no matter which way the cam-cylinder is moving the needles knit continuously along the fashioning set, and that without any unnecessary motion which would entail an extra amount of wear upon the cams and bits of the needles. The motion of these needle-cams, with the results above indicated, is effected in the first instance by sliding cam-rods (hereinafter called simply "rods") upon the exterior of the cam-cylinder, which are in turn controlled by rod-cams formed upon cam-plates affixed to the upper surface of two segmental plates, (hereinafter called "cam-segments,") situated within the annular recess in the center of the table surrounding the cam-cylinder, which has been referred to. The rods will first be described in order and then the rod-cams by which they are controlled.

The lifting-cam $12^b$ is controlled by a lever $b'$, passing through a vertical slot in the wall of the cam-cylinder and pivoted at its outer extremity to the depending member of a bracket $b^2$, situated on the outside of the cam-cylinder directly opposite the cam, and therefore directly in the rear of the machine when in its normal position. A spring $b^6$ within a slot in the bracket tends to depress this lever and with it the cam. A yoke $b^3$ surrounds the lever intermediately and is held firmly against the inner side of the depending member of the bracket by springs $b^4 b^4$ on either side. This yoke forms the central portion of a vertical rod $b$, the upper end of which passes through a slot $b^5$ in the cross-piece of the bracket, and the lower end of which projects down nearly to the surface of the cam-segments coming within the plane of action of the rod-cams mounted thereon.

The yoke $b^3$ has formed on the outward surface of its upright members a horizontal flange $b^7$, which is received into a corresponding groove on the inner surface of the depending member of the bracket $b^2$ whenever the yoke is in its upper position, whereby the yoke is held in this position by the spring $b^4$ against the action of the spring $b^6$, thus maintaining the lever $b'$, and with it the lifting-cam $12^b$, in its upper position. When, however, the lower end of the rod $b$ strikes the rod-cam upon the cam-segment, the flange of the yoke is pressed out of its groove against the action of the spring $b^4$, allowing the spring $b^6$ to push the yoke down, carrying with it the cam $b^3$, which therefore becomes inactive and remains so until the flange of the yoke is pushed up and replaced in its groove by the same rod-cam upon the return motion of the cam-cylinder. The depressing-cams $12^c$ $12^d$ are controlled by vertical rods $c$ $d$ on the outside of the cam-cylinder, which are connected to their respective cams by pins $c'$ $d'$ passing through vertical slots in the wall of the cam-cylinder. Springs $c^6$ $d^6$, which are fast at their lower extremities to small pins $c^2$ $d^2$, projecting from the wall of the cam-cylinder, and at their upper extremities to pins $c^3$ $d^3$, projecting from the rods, tend continually to push down the rods $c$ $d$, and with them their depressing-cams $12^c$ $12^d$, into their lower and active positions. The rods are held against the sides of the cam-cylinder by flat springs $c^4$ $d^4$, and their vertical translation is secured by longitudinal slots $c^5$ $c^5$ $d^5$ $d^5$, which receive small screws projecting from the cam-cylinder. The lower ends of these rods project down nearly to the surface of the cam-segments, thereby coming within the plane of action of their respective rod-cams mounted thereon. Upon the inner surface of each of these rods is formed a small lug $c^7$ $d^7$, and in the line of the vertical translation of each of the rods two small holes, capable of receiving the corresponding lug, are formed on the exterior of the cam-cylinder. When the rod $d$ is in its upper position, as seen in Fig. 19, the lug $d^7$ is received into the upper of the two holes, whereby it is held in this position by the spring $d^4$ against the action of the spring $d^6$. When, however, the lower end of the rod strikes a rod-cam upon the cam-segment, the lug is thrown out of the upper hole against the action of the spring $d^4$, allowing the spring $d^6$ to pull the rod down until the lug is in the lower hole, carrying with it the cam $12^d$, which therefore becomes active and remains so until the rod strikes another rod-cam at the other extremity of its stroke, and is thereby raised and the lug replaced in the upper hole. The action of the rod $c$ is precisely similar. In order that the rods may terminate at different distances from the center of the machine, and consequently be acted upon only by their own rod-cams, the rod $c$ is made perfectly straight, while the rod $d$ is formed with a shoulder $d^8$ near its lower extremity, which is thereby removed farther from the center of the machine than that of the rod $c$. The lower extremity of the rod $b$ is still farther removed from the center of the machine by reason of the length of the cross-piece of the bracket $b^2$.

The parts being in their normal positions and the throw of the clutch-lever 31 having locked the stem and released the cam-cylinder, the first half-stroke of reciprocation of the cam-cylinder takes place in the direction of the upper arrow of Fig. 9, (to the right in Fig. 1.) Consequently the cams are already in position to operate the needles during the remainder of this stroke. When this stroke has reached the proper point for the needles to cease to operate, as determined by the number of needles which it is proposed to retain in the fashioning set, it is necessary that the lifting-cam $12^b$ should be depressed, so that the needles shall cease to be advanced to receive a new loop. At the same time or immediately afterward it is necessary that the depressing-cams shall alternate in position so as to be prepared for the return stroke, during which, in order to operate the needles properly, the depressing-cam $12^c$, which is to become the leading cam, must be raised, and the depressing-cam $12^d$, which is to become the following cam, must be lowered. At the proper point of the return stroke the lifting-cam $12^b$ must be again thrown into action, and then toward the end of the return stroke this operation must be repeated. To effect these various motions, three sets of rod-cams corresponding to the three rods $b$ $c$ $d$ are mounted in proper position upon the cam-segments, one of each set being at the proper distance from the center of the machine on the right-hand cam-segment and its fellow being on the left-hand segment at the same distance. These rod-cams and their position and mode of operation will now be described.

The two segmental plates or cam-segments 55 and 55' fill each an annular segment, forming about one-third of the annular space formed between the base-ring of the cam-cylinder in the center of the table and the concentric periphery of the circular recess surrounding it. The depth of the cam-segments is such that their upper surface is flush with the surface of the table. A small section of this annulus immediately in front of the table is permanently filled by the plate $51^a$, within which slides the upper locking-lever $50^a$. The cam-segments are normally in juxtaposition to this stationary plate, the segment 55 being to the right of it and the segment 55' to the left. The vacant third of the recess is therefore directly in the rear with the slide-rods overhanging the center of it, as seen in Fig. 1. To the surface of the cam-segments are affixed four cam-plates 56, 56', 57, and 57'. The plate 56 is shown in detail in Fig. 21. It is affixed to the right-hand segment 55 by screws passing through slots, so that its circumferential position can be adjusted with the utmost nicety. Along with its fellow 56' it is within the circular plane within which the rod $b$ reciprocates, and by means of the two the movements of the lifting-cam $12^b$ are effected.

The operative portion of the cam-plate 56, which is somewhat higher than the slotted portion, has a height above the cam-segment representing approximately the difference between the upper and lower positions of the rod $b$, and the forward end of this portion has two inclined planes $58^a$ $58^b$, separated by the rod-cam B. This rod-cam projects sufficiently above the surface of the cam-plate and its distance from the center of the machine is such that it will be struck on its inner surface, which presents a gentle bevel toward the center of the machine, by the end of the rod $b$ in its upper position. The cam-plate 56', carrying the rod-cam B', is precisely similarly affixed to the left-hand segment, and is in every respect the left-hand mate of the cam-plate 56. It need not, therefore, be particularly described, and it is not separately shown in detail in the drawings. The operation of the rod $b$ by these two cams B B' will now be explained. When the first half-stroke of reciprocation takes place, the slide-rod $b$, being in its upper position, is carried to the right until its lower end comes into contact with the inner beveled surface of the cam B, and is by it drawn gently inward until the flange $b^7$ has cleared the groove in which it is resting. The rod is still held in its upper position by reason of its extremity resting upon the upper surface of the cam-plate until the inclined plane $58^b$ is reached, at which point it is suddenly lowered by the action of the spring $b^6$, the cam B projecting beyond the inclined plane and still holding the end of the rod inward, so that the flange $b^7$ can clear the groove. Having been thus lowered, the rod soon reaches the end of the cam, when it snaps back to its vertical (though still lower) position, in which it remains until the termination of the right-hand stroke. Upon commencing the return stroke to the left it passes outside of the cam B, by reason of the incline at which the latter is set, and strikes the inclined plane $58^a$, is pushed up, and as it is now free from the inward pull of the cam the flange $b^7$ snaps back into its groove, whereby it is retained in its upper position during the remainder of the left-hand stroke until reaching the cam B' on the left-hand end of the cam-segment 55', where precisely the same operation takes place, the cam B' holding the flange out of its groove until the rod $b$ reaches the incline $58^{b'}$, by which it is lowered and remains so until replaced by the incline $58^{a'}$ at the commencement of the left-hand stroke. It will be noted that the outer edge of the rear end of the cams B B' necessarily strikes the end of the rod when it passes on their outer side and tends to push the end of it out beyond the vertical position, to allow for which unavoidable, though functionless, motion a portion of the inner surface of the depending member of the bracket $b^2$ below the groove is beveled outward, as seen in Fig. 20, while the slot $b^5$, through which the upper end of the rod passes, is sufficiently long to afford to it a slight play upon its flange, as upon a trunnion. The result of the action of these cam-plates 56 56' therefore is that the rod $b$ is elevated and the needle-cam $12^b$ therefore operative during that portion of both the right and left hand strokes of the cam-cylinder in which the rod is between the two cam-plates, and during the remainder of the time it is depressed and the needle-cam therefore inoperative.

The exact point at which the needle-cam $12^b$ will be thrown out of action upon the right-hand stroke is determined by the position of the inclined plane $58^b$, while the exact point at which it is again thrown into action at the commencement of the left-hand stroke is determined by the position of the inclined plane $58^a$. It will be noted that the former of these is slightly forward of the latter, the result of which is that the extreme needle of the fashioning set which was in action during the right-hand stroke is dropped out of action upon the left-hand stroke. The same is true of the inclined planes upon the cam-plate 56'. The delicate adjustment between these inclined planes, whereby the last needle of the fashioning set is given a tuck-stitch rather than a full stitch, will be described later on.

The cam-plates 57 57' are seen in detail in Figs. 22 and 23. They are affixed, respectively, to the right and left hand cam-segments 55 and 55'. Their operative portions have a height above the cam-segments representing approximately the difference between the upper and lower positions of the rods $c\ d$, and each carries at its rear extremity and alongside of each other two rod-cams C D C' D'. Along the outer edge of each of these cams is an inclined plane running from the top to the bottom of the rear end of the cam-plate. The cams C C' are within the circular plane within which the rod $c$ reciprocates, and by their agency, in coöperation with that of the inclined planes along their outer edges, the movements of the rod $c$, and consequently of the depressing-cam $12^c$, are effected. Similarly the cams D D' are within the circular plane within which the rod $d$ reciprocates, and by their agency and that of the inclined planes along their outer edges the movements of the depressing-cam $12^d$ are effected. In the right-hand cam-plate 57, Fig. 22, the cam C has an elevation only equal to that of the cam-plate, while the cam D is considerably higher. In the left-hand cam-plate 57', Fig. 23, these conditions are reversed, the cam C' being considerably higher than the cam D', which reaches only to the top of the plate. The operation of the rods $c\ d$ by these cams affixed to the cam-plates 57 57' will now be explained. When the first half-stroke of reciprocation takes place, the rod $c$ is, as we have seen, in its lower position and the rod $d$ in its upper; that is to say, the leading depressing-cam is up and the following one down. In this position the rod $c$ is carried to the right until its lower end comes into contact with the outer beveled surface of the cam C and is by it drawn outward until its lug $c^7$ clears the lower hole in which it is resting. From this position the inclined plane $59^c$ raises it against the action of the spring $c^6$ into its upper position. At the top of the plane, its end having cleared the cam C, which is no higher than the plane, its lug snaps into the upper hole and remains there during the remainder of the stroke. Upon passing this cam at the commencement of the return (i. e., left-hand) stroke no change takes place, as the end of the rod $c$ is now out of reach of the low cam C. Toward the end of the left-hand stroke, however, it reaches the high cam C' on the plate 57', which is within its reach, the outer beveled surface of which draws it outward until its lug clears the upper hole. The surface of the cam-plate prevents it from being depressed during the remainder of this stroke, but upon passing this cam on the return (i. e., second right-hand) stroke, when it reaches the inclined plane $59^{c'}$, it is lowered by the action of the spring $c^6$, the cam C' still holding its end outward, so that the lug $c^7$ clears the upper hole. It remains in this lower position during the remainder of this right-hand stroke until reaching the cam C, when the operation begins to repeat itself. The result of the action of the cams C C' therefore is that during that portion of the right-hand stroke which takes place between the cams the needle-cam $12^c$ is down, while during that portion of the left-hand stroke which takes place between them it is up. In other words, the needle-cam $12^c$ is operative when it follows and inoperative when it leads. The rod $d$ goes through precisely the same movements in alternation with the rod $c$. When the first half-stroke of reciprocation takes place, it is, as we have seen, in its upper position. As it is carried to the right its lower end comes into contact with the outer beveled surface of the high cam D on the plate 57. No change takes place until it passes this cam at the commencement of the return (i. e., left-hand) stroke, when, upon passing the inclined plane $59^d$, it is depressed by the action of the spring $d^6$. It remains down during the rest of this stroke until it reaches the inclined plane $59^{d'}$, when the low cam D' allows it to be elevated, at which point the operation begins to repeat itself. The result of the action of the cams D D' therefore is that during that portion of the right-hand stroke of the cam-cylinder which takes place between them the needle-cam $12^d$ is up, while during that portion of the left-hand stroke which takes place between them it is down. In other words, the needle-cam $12^d$ is operative when it follows and inoperative when it leads. It therefore follows, as the result of the joint action of all of the rod-cams, that during those portions of the reciprocating strokes which take place between the inclined planes which depress and raise the lifting-cam $12^b$ the needle-cams are always in position corresponding to the direction of the stroke to operate the needles, while at the same time that one of the depressing-cams which is not required to be in operative position is out of line with the bits of the needles, so as to cause no unnecessary friction.

Figure 10:
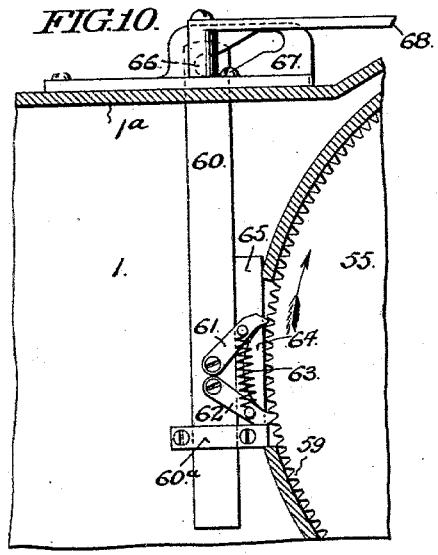
Figure 11:
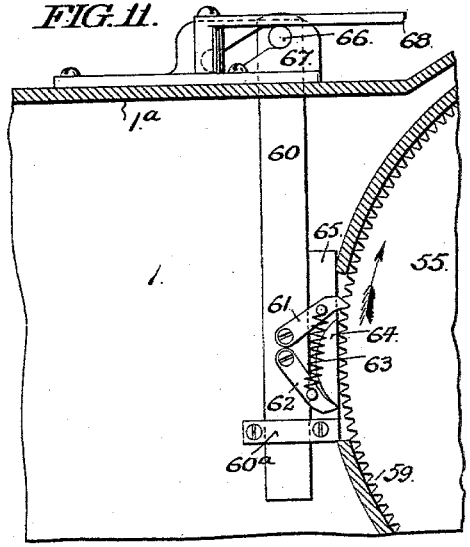

4. *The mechanism whereby the narrowing and widening of the heel and toe pockets is effected.*—In order to form a pocket instead of a perfectly straight strip on one side of the stocking during the reciprocation of the cam-cylinder, it is necessary that the points at which the needles become inactive shall first approach each other and then recede to their former position, thus first dropping out of action at the end of each stroke one needle which had formerly been in action until the requisite narrowing has been accomplished and then reversing the process until the pocket has been widened to its orignal extent. As the length of the fashioning set depends always upon the distance between the right and left hand cam-plates this widening and narrowing is accomplished by causing the cam-segments and therefore the cam-plates which they carry to slide in their annular recess, approaching each other in the rear, and when the motion in this direction has gone sufficiently far by causing the operation to be reversed. This is effected as follows: Around the outer edges of the cam-segments 55 55' is formed a rack 59 59', which projects slightly through a slotted space left at the sides between the surface of the table and the surface of the recessed portion within which the segments slide. Underneath the surface of the table at each side is a transverse pawling-bar 60 60', each of which carries two opposing pawls. Those upon the pawling-bar 60 are seen in Figs. 10, 11, 12, and 13, numbered 61 and 62. These pairs of pawls mesh with the corresponding rack on the edges of the cam-segments. Springs 63 63' tend to draw the ends of these cams together, while a tripping-cam 64, Figs. 10 and 13, is interposed between each pair of opposing pawls and keeps them the necessary distance apart. These tripping-cams are mounted on transverse slide-bars 65 65', which are capable of a slight longitudinal movement, and according as they are thrown to one or the other extreme of their play the tripping-cams throw one or other of the pawls out of action. Thus in Figs. 10 and 11 the slide-bar 65 is in its forward position. Consequently the forward pawl 62 is rendered inoperative (except as a detent) by the tripping-cam, and the reciprocation of the pawling-bar 60 by the means about to be described communicates to the cam-segments an intermittent motion in the direction indicated by the arrow through the action of the rear pawl 61 upon the rack 59. In Figs. 12 and 13 the slide-bar 65 is shown in its rear position. Consequently the rear pawl 61 is rendered inoperative by the tripping-cams, and the reciprocation of the pawling-bar 60 communicates to the cam-segment an intermittent motion in the direction indicated by the arrow through the action of the forward pawl 62 upon the rack 59. The operation upon the left-hand side is precisely similar.

The reciprocation of the pawling-bars 60 60' is effected as follows: The rear extreme of each bar projects a short distance back from the rear of the table and carries a downwardly-projecting pin 66 66', which is received within a diagonal slot in the sole of a sliding bracket 67 67'. The wall-plate of each of the brackets has longitudinal slots receiving pins affixed to the side of the depending rim of the table, which guide and limit their motion. Each bracket has pivoted to it a connecting-rod 68 68', the other end of which is pivoted to a lever-arm 69 69', the other end of which is in turn pivoted to the corresponding lower corner of the depending bearing-arm 37, by which the bevel-wheel 36 is carried. The intermediate portions of the lever-arms carry projecting pins, which are received into sigmoid slots 70 70' in the bevel-wheel. The shape of these slots is such that the half-stroke of reciprocation of the bevel-wheel in either direction actuates only one of the brackets, the other remaining motionless. Thus when the bevel-wheel is moved from its normal position to the right (the left as seen in Fig. 5) to the end of its stroke and returned again to its normal position the right-hand bracket 67 is advanced and retracted and with it the right-hand pawling-bar 60 reciprocated, while the corresponding left-hand members 67' and 60' are stationary, and vice versa, during the left-hand half-stroke of the bevel-wheel. Thus during the complete reciprocation of the cam-cylinder, starting from its normal position, first the right-hand pawling-bar 60 and then the left-hand pawling-bar 60' performs a complete reciprocation. The reciprocation of these pawling-bars intermittently advances and retracts the cam-segments according as the tripping-cams are in their forward or rear positions, which positions are determined as follows: The transverse slide-bars 65 65', upon which the tripping-cams are mounted, are connected by pins sliding in longitudinal slots in the surface of the table with corresponding slide-bars 71 71' on the upper surface of the table. These slide-bars have inwardly-projecting lugs 72 72' in position to be struck by corresponding lugs 73 74 73' 74', affixed at suitable intervals around the top of the periphery of the cam-segments. The operation is as follows: When the motion of reciprocation is about to begin, the parts are in their normal position, as seen in Figs. 1 and 10, in which case the slide-bars 71 and 71', and consequently their respective tripping-cams, are in their forward positions, rendering the rear pawls operative. The first half-stroke of reciprocation of the cam-cylinder to the right and return to the center effects the full reciprocation of the left-hand pawling-bar 60', the rear pawl of which causes the left-hand segment 55' to advance one tooth. The next half-stroke of reciprocation to the left and return similarly advances the right-hand segment 55 one tooth, the two extreme positions of the pawling-bar 60 during this operation being shown in Figs. 10 and 11. The teeth are so spaced that the advance of either cam-segment for the space of one tooth causes the dropping out of action of one needle at the corresponding end of the fashioning set, and as the reciprocation of the cam-cylinder continues during each half-stroke the segment on the side away from which the needle-cams are being swung is advanced one tooth in regular alternation, rendering the fashioning set two needles shorter at the end of each complete reciprocation of the cam-cylinder. When this advance of the cam-segments and corresponding shortening of the fashioning set of needles has proceeded to a predetermined point, depending upon the depth of the pocket which it is proposed to form, the lugs 72' and 72 are successively struck by the lugs 74' and 74, reversing the position of their respective tripping-cams and causing the same reciprocation of the pawling-bars which formerly advanced the cam-segments to retract them. This retraction proceeds in regular alternation (the two extreme positions of the right-hand pawling-bar 60 being shown in Figs. 12 and 13) until the segments have returned to their starting-points, where the lugs 72' 72 are successively struck on their opposite sides by the lugs 73' 73, effecting a second reversal. At this point mechanism which will be hereinafter described causes the motion of reciprocation to cease and that of revolution to begin, leaving the cam-segments in position to repeat their movements whenever the proper time arrives for the formation of another pocket.

In order that the cam-segments may be held in an unyielding position during that portion of the stroke of reciprocation of the cam-cylinder when their respective pawling-bars are idle, which in the case of each cam-segment is that portion of the stroke during which its cam-plates are subjected to the friction accompanying their contact with the rods which they operate, it is desirable that a locking device should be provided. In Figs. 10 to 14 this is accomplished by placing the transverse slide-bearing 60$^a$ of the pawling-bar 60 in such a position as to cause the forward pawl to be always forced and held between two teeth of the rack at the end of each complete reciprocation of the pawling-bar. By proper adjustment this is caused to occur both when this pawl is in its operative position, as shown in Figs. 12 and 13, in which case the reciprocation ends with this pawl locking the segment and in place to recover for a new stroke, and also when this pawl is idle, as shown in Figs. 10 and 11, in which case it only acts as a detent, and is in position to lock the segment when the reciprocation ends, the operative pawl being then at the end of its recovery. Instead of this arrangement a separate locking-bar 60$^b$ may be used, as shown in Fig. 14, where the locking-bar is drawn back and movement of the cam-plate permitted the moment the operative pawl begins to be pushed by the pawling-bar against the tooth with which it engages. This movement is effected by means of a lug on the side of the pawling-bar, the beveled edge of which engages a corresponding lug on the rear of the locking-bar, pressing it back against the resistance of a spring which keeps it in engagement between the teeth of the segment at both ends of the reciprocation of the pawling-bar. In this latter respect it is an improvement upon the arrangement first described, which only locks the segment at the termination of a full stroke of reciprocation instead of at the end of every half-stroke.

As has been before explained, the cam-plates 56 and 56' determine the points at which the needles are alternately dropped out of action at either end, the exact position at which this occurs depending upon the relative position of the inclined planes 58$^b$ 58$^{b'}$. By delicate adjustment, effected by means of the screws and slots by which these cam-plates are affixed to the segments, they may be so placed that the last needle which is actuated by the raising-cam 12$^b$ is lifted but half-way during the narrowing process, that is, far enough to receive a new loop, but not far enough for its latch to slip the old one, thus operating as a tuck-needle. The same is true of the end needle of the inoperative set, which is about to be brought into action at the next stroke during the widening process, as is more fully described in Letters Patent No. 427,787, granted to Benjamin Holt and myself April 1, 1890, the result of which adjustment is to form a double stitch all along the narrowing-lines, whereby the objectionable openings otherwise formed along these lines are prevented.

5. *Mechanism for tightening or loosening the stitch.*—It will be noticed in Fig. 3 that the shoulder on the lower side of the flange 6 rests closely against the upper edge of the bearing 3, but that a small space intervenes between it and the contiguous side of the recessed spur-wheel 16. Within the limit indicated by this space the stem 4, needle-cylinder 5, and all its accompanying parts are capable of vertical motion. The effect of this motion is to allow a tightening or loosening of the stitch. When the stem is pushed up, the cam-groove, acting upon the bits of the needles, draws them farther down within their grooves at the end of each loop than would otherwise be the case, resulting in an elongating or loosening of the stitch, and consequently an enlargement of the tube which is being knit. On the other hand, when the tube is pushed down the work is narrowed. As the leg should be larger than the foot of a stocking it is desirable that the stem be pushed up during the formation of the leg and pushed down during the formation of the foot. This motion is effected as follows: Upon the stem immediately below the spur-wheel 16 is a cam-wheel 75, the cam of which acts upon one end of the lever 76, intermediately pivoted at 77 to the large horizontal bracket-plate 78, bolted under the left-hand web $1^c$ and projecting inwardly therefrom. The other extremity of this lever engages a pin 79 upon the pawling-rod 80, sliding in bearings depending from the bracket-plate 78, the motion of the lever being opposed by the spiral spring 81, encircling the rod. The reciprocation of this pawling-rod, which is thus effected by the cam on the cam-wheel 75, is continuous during the revolution of the needle-cylinder and imparts intermittent rotation to a compound ratchet-wheel 82, through the medium of a pawl 83 pivoted to the pawling-rod.

The compound ratchet-wheel is formed of two members, a positive wheel $82^a$ and an idle-wheel $82^b$, the latter being of slightly greater diameter than the former. Every alternate space of the idle ratchet-wheel $82^a$ is sufficiently shallow to carry the pawl over the teeth of the positive wheel without engagement, whereby two reciprocations of the pawling-rod are required to advance the positive wheel one space. This ratchet-wheel 82 forms the head of a ribbed chain-drum, carrying three pattern-chains $86^a$ $86^b$ $86^c$, the alternate links of which fit into notches in the drum-ribs. To steady the action of the drum during the recovery of the pawl, it carries an intermediate rim 84 with shallow dents around its periphery, into which a small detent 85 falls. Of these three pattern-chains the left-hand one $86^a$ effects the raising or lowering of the stem, so as to loosen or tighten the stitch. It contains a series of elevated links, which when carried to the top of the drum elevate one end of the lever $87^a$, intermediately pivoted to the side of the left-hand standard 2, the other extremity of which lever is pivoted to the upper end of a connecting-rod $88^a$, the lower end of which is pivoted to a lever $89^a$, intermediately pivoted to the under side of the cross-piece $2^a$, the other extremity of which is in contact with the lower end of the vertical pivot upon which the stem 4 revolves, which pivot passes through its bearing in the cross-piece $2^a$ and is capable of vertical movement therein. When the elevated links upon the chain $86^a$ elevate the end of the lever $87^a$, the connections which have been described cause a corresponding elevation of the pivot upon which the stem revolves and consequently an elevation of the stem itself with its needle-cylinder, while as soon as the elevated links have passed from under the end of the lever $87^a$ the stem is allowed to fall of its own weight. By arranging the elevated links upon the pattern-chain $86^a$ in the proper position the stem is caused to be elevated while the leg of the stocking is being knit and depressed while the foot is being knit, bringing about the proper variation of the diameter of the stocking-tube.

6. *The mechanism for automatically exchanging the motion of revolution for that of reciprocation, and vice versa.*—As has been before explained, the change from one motion to the other is effected by the clutch-lever 31 operating upon the differential clutch 30. This lever is always in a position to be moved by hand from one position to the other; but in addition to this mechanism is provided whereby the lever is automatically thrown first to the left and then to the right at the completion of a predetermined number of rows of loops. The throwing of the lever to the left, whereby the motion of revolution gives way to that of reciprocation, is accomplished by means of the right-hand pattern-chain $86^c$. It contains in the proper place an elevated link, which when carried over the top of the drum elevates one end of the pivoted locking-lever $87^c$, thereby removing its other extremity from the annular groove in the slide-rod $88^c$, into which it is normally received. This slide-rod is carried by slide-bearings in bearing-arms $89^c$ $90^c$, depending, the former from the rim, the latter from the under surface of the table. The other extremity of the slide-rod $88^c$ passes freely through an opening in a block $31^c$, formed upon and projecting from below the clutch-lever 31 near the shank of the handle and engaging it on its right-hand side by means of a pin.

The lever 31 is initially placed in the position in which it is shown in Fig. 6, in which case the slide-rod $88^c$ is set against the action of a strong spiral spring which surrounds it and presses at one end against the depending bearing-arm $90^c$ and at the other against a collar on the middle of the rod, and by means of the lever $87^c$ falling into the annular groove the slide-rod is locked in place against the side of the depending bearing-arm $89^c$. When the revolution of the pattern-chain $86^c$ brings the elevated link to the top, it trips the lever $87^c$, the spring shoots the slide-rod $88^c$, drawing after it the lever 31, causing the clutch to disengage the revolving mechanism and engage the reciprocating mechanism. A slide-bar 91 is pivoted to the surface of the bevel-wheel 36, the other end of which has a longitudinal slot 92, embracing the rear extremity of a lever $93^c$, pivoted intermediately to the top of the bracket-plate 78. The forward extremity of this lever carries a fork, which engages a collar $94^c$ on the slide-rod $88^c$. As long as the slide-rod and lever $93^c$ are in the position shown in Fig. 6 the length and position of the slot 92 are such that the reciprocation of the slide-bar 91 has no effect upon the lever 93$^c$; but when the slide-rod 88$^c$ has been shot into its left-hand position the first movement of reciprocation of the bevel-wheel which ensues, pushing the slide-bar 91 to the left, actuates the lever 93$^c$ and causes the fork on its forward end to reset the slide-rod 88$^c$ in the position shown in Fig. 6, where it is locked by the lever 87$^c$ and remains so until the lever is again tripped by the pattern-chain. The resetting of the slide-rod 88$^c$ has, however, no effect upon the position of the clutch-lever 31, the rod being simply pushed forward through the opening in the block 31$^c$, below the lever, which remains with the clutch in engagement with the reciprocating mechanism while the cam-segments are running their backward and forward courses. The throw of the lever to the right, whereby after the segments have once completed their course and thus formed a heel or toe pocket the revolution of the needle-cylinder is recommenced, is effected as follows: The lug 74$^d$ on the right-hand cam-segment 55 is different in shape from the others, having its left-hand edge beveled. When the cam-segment is at its initial position, as shown in Fig. 1, this lug is immediately alongside a one-way lug 95$^d$, pivoted to the left-hand end of a lever 95, which is intermediately pivoted upon the forward edge of the upper surface of the table. The right-hand end of this lever 95 engages the upper extremity of a vertical locking-lever 87$^d$, intermediately pivoted upon the forward rim of the table, the lower and inwardly-curved extremity of which is normally received into an annular groove in the slide-rod 88$^d$, carried by a slide bearing in a bearing-arm 89$^d$, depending from the forward rim of the table. The extremity of this slide-rod 88$^d$ passes freely through another opening in the block 31$^c$, below the clutch-lever, and engages it on its left-hand side by means of a collar 94$^d$ on its left-hand end.

The slide-rod 88$^d$ has been initially set against the action of a strong spiral spring, which surrounds it and presses at one end against the depending bearing-arm 89$^d$ and at the other end against a collar on the right-hand end of the rod, and by means of the lever 87$^d$ being pushed into the annular groove by a small bow-spring 96 it is locked in place against the side of the depending bearing-arm 89$^d$. When the cam-segment 55 starts upon its advance, the lug 74$^d$ passes idly over the inclined end of the one-way lug 95$^d$, which yields in that direction. When, however, the cam-segment, having completed its course, reaches this point upon its return, the one-way lug refuses to yield and is pressed outwardly by the beveled edge of the lug 74$^d$. This movement actuates the lever 95, throwing back the right-hand end and thereby tripping the lever 87$^d$. This allows the spring to shoot the slide-rod 88$^d$, drawing after it the lever 31 and causing the clutch to disengage the reciprocating mechanism and reëngage the revolving mechanism. A horizontal bell-crank lever 93$^d$ is pivoted intermediately below the table, the rear extremity of which is in a position to be actuated by the cam of the cam-wheel 75. The forward extremity of this lever carries a fork engaging with the collar 94$^d$ on the end of the slide-rod 88$^d$. As long as the slide-rod and lever 93$^d$ are in the position shown in Fig. 6 the rear end of the lever is out of reach of the cam upon the cam-wheel 75; but when the slide-rod 88$^d$ has been shot into its right-hand position, carrying with it the forward extremity of the lever 93$^d$, the latter is in such a position that it is actuated by the first revolution of the needle-cylinder which ensues, thereby causing the fork on its forward end to reset the slide-rod 88$^d$ in the position shown in Fig. 6, where it remains until the lever 87$^d$ is again tripped. As before, however, the resetting of the slide-rod 88$^d$ has no effect upon the position of the clutch-lever 31, which remains with the clutch in engagement with the mechanism of revolution until reversed by the shooting of the slide-rod 88$^c$. The pattern-chain 86$^c$ need carry but two elevated links. These are so spaced that when the revolution of the needle-cylinder has proceeded until the knitting of the leg of the stocking is completed the first link comes to the top, and tripping the lever 87$^c$ reverses the clutch-lever. During the reciprocation of the needle-cylinder which ensues the pattern-chain is inactive. When the reciprocation has completed the heel-pocket, the tripping of the lever 87$^d$ reverses the clutch-lever and the formation of the foot of the stocking commences, during which the pattern-chain again advances. When this has been completed, the second elevated link of the pattern-chain comes to the top again, tripping the lever 87$^c$, throwing the clutch-lever, and causing the formation of the toe-pocket, upon the completion of which the stocking is finished and the machine automatically stopped, as will be hereinafter described.

7. *The thread-controlling mechanism.*—From the rear of the central portion of the table there projects horizontally at the level of the surface of the table an arm 97, which is bracketed to the table by means of the upper portion of the depending arm 37. Upon this arm is erected a gibbet, on which is mounted the thread-controlling mechanism. The gibbet consists of the upright 98 and the projecting arm 99, the height of which upon the upright may be regulated by a set-screw. The main thread upon the bobbin or reel (which is the uppermost of the two threads seen in Figs. 2 and 7) passes through eyes $m$ $n$, projecting up from the top of the arm 99, then through an eye $p$, depending from the forward end of a tension-arm $q$, and then down through a vertical hole at the end of the arm 99 to the thread-guide 54, which is affixed to the upper rim of the cam-cylinder and feeds the thread into the needle-hooks. The tension-arm $q$ is swiveled upon a horizontal pivot mounted upon the upwardly-projecting arm $r$ upon the upper surface of the arm 99. The rear extremity of the tension-arm projects backward and carries a counterweight $s$, adjusted so as to slightly overbalance the forward part of the arm. A vertical slide-rod 100 is supported by and slides within a vertical bearing in the extremity of an upright bracket 101, bolted on top of the arm 97. The upper end of this slide-rod 100 passes through a vertical hole in the arm 99, and also carries affixed to it a wire hook $t$, which engages the forward end of a lever $v$, which is intermediately pivoted to the arm $r$. The rear extremity of the lever $v$ is weighted and also projects far enough backward to support, when in the position shown in Fig. 2, the weighted end of the tension-arm $q$. The slide-rod 100 is heavy enough to maintain itself normally in its lower position, in which case the forward end of the lever $v$ is down, so supporting the rear end of the tension-arm that its forward end is also down. In operation, during the revolution of the needle-cylinder, the slide-rod is in this lower position. The thread therefore runs steadily off its reel through the eyes which have been mentioned, subject to no other tension than that produced by their friction, and as the thread-guide is then stationary and the pull upon the thread perfectly even no other tension is necessary. When, however, reciprocation of the cam-cylinder begins, by means of which the thread-guide is alternately swung first in one direction and then the other, it is necessary that a greater tension be placed upon the thread, in order that the reception by the extreme needle of the fashioning-set may be accurate, and it is also necessary to provide an elastic take-up which shall be able to quickly draw back the excess of thread necessarily released during those portions of the reciprocating movement in which the cam-cylinder and therefore the thread-guide are swinging back toward their central position. To effect this, there is bolted to the side of the clutch-lever 31 a rearwardly-projecting extension $31^e$, to the rear end of which is pivoted a horizontal slide-bar 102. This slide-bar, after passing, by the interposition of a shoulder, from the level of the clutch-lever to the level of the surface of the table, runs along the top of the table at its rear, its motion being limited and guided by two longitudinal slots receiving pins projecting from the surface of the table. The left-hand portion of the slide-bar runs directly beneath the lower end of the slide-rod 100, which rests upon it, and its normal thickness is such as to allow the rod to remain in its lower position. Upon one portion of this end, however, it carries a large shoulder 103, presenting toward the end of the slide-rod an inclined plane, and when the clutch-lever 31 is thrown to the left, whereby the motion of reciprocation is effected, the motion of the slide-bar 102 is such as to throw this shoulder directly under the end of the slide-rod 100, elevating it to its upper position. This elevation is sufficient to allow the weighted end of the lever $v$ to fall. The effect of this is twofold. The weight has on its lower edge a tooth which then lies against the top of the thread, exerting the required positive tension upon it. Also the weighted end of the tension-arm $q$ is released from its support, and its forward end is therefore free to swing up and down, carrying with it the thread passing through the eye $p$, thereby acting as a swinging or elastic take-up, keeping the thread taut even during the backward swings of the cam-cylinder.

While the reciprocating motion is in process it is frequently desirable that a second thread be fed into the needle along with the first, in order that the heel and toe pockets may be reinforced. Mechanism is provided for automatically effecting this as follows: In Fig. 2 the second thread is seen just below the first thread passing successively through the eye $m$, the hole in the upper end of the slide-rod 100, the eye $n$, the eye $o$, and thence down through an eye in the forward end of the swinging thread-arm $w$, pivoted at its rear end to the arm 99. When the slide-rod 100 is elevated at the beginning of the motion of reciprocation, this swinging thread-arm $w$ is thrown forward by means of a small pin on the side of the slide-rod against which the lower edge of the thread-arm bears. By throwing this arm forward the loose end of the reinforcing-thread, which passes through its forward end, is thrown loosely over the main thread, and being guided by the latter as it proceeds is carried with it through the thread-guide 54 and into the needles. When the reciprocation stops and the slide-rod falls, the small hole at its upper extremity, through which the reinforcing-thread passes, is carried down into the vertical hole in the arm 99, through which the rod passes, thus biting this thread hard and causing it to break off short against the thread-guide 54, while at the same time the swinging arm, being released from its support, falls back and carries the loose end of the reinforcing-thread away from the main thread, in which position it is seen in Fig. 2, where it remains until the motion of reciprocation again takes place, when the process begins to repeat itself.

In Fig. 7 there is shown an alternative form of the thread-controller. That portion of this alternative form which has reference to the reinforcing-thread is precisely the same as above, but the tension-arm $q'$, instead of being overbalanced by a counterweight, is swiveled against the torsional strain of a spring (not seen in the drawing) surrounding its pivot, and the tension-arm is held down when the slide-rod has fallen, during the revolution of the needle-cylinder, by the wire hook

*t*, which now passes directly over the forward part of the tension-arm $q'$ and holds it down, allowing the thread to run freely. When the slide-rod is up during the motion of reciprocation, the tension-arm $q'$ is released and acts as an elastic take-up, as above, but instead of a weight producing the positive tension an automatic tension-lever $z$ is substituted in its place. This lever is intermediately pivoted on the side of the arm $r$, and its rear end carries a small depending tooth, which by its own weight falls lightly on the thread, biting it into a corresponding notch on the upper surface of the arm 99. The forward end of the lever $z$ extends up to the lower edge of the tension-arm and its length is such that when the tension-arm is down (either held down by the wire hook on the slide-rod or depressed by the pull of the thread during the extremes of reciprocation) the rear end of the lever $z$ is raised and the thread is permitted to run freely. When, however, the tension-arm $q'$ begins to elevate in taking up released thread, the rear end of the lever is permitted to fall and the tension is reinstated.

8. *The mechanism for taking up the work as it is completed.*—Between the forks $4^a$ $4^{a'}$, into which the lower end of the stem divides, are mounted two horizontal rollers E F and a horizontal winding-frame G. The uppermost of these rollers E is covered with a roughened surface, (as of cloth.) Its axle projects at each end through its bearings in the forks and carries externally to them on one side a spur-wheel $e$ and on the other a band-wheel $e'$. The wheel $e'$ is affixed to its axle and imparts revolution through the interposition of a band passing around the band-wheel $g'$ upon the corresponding projecting extremity of the axle of the winding-frame G. The band is, however, so loose as to allow great variations in the rate of revolution of the winding-frame G. The spur-wheel $e$ revolves loosely upon its axle, subject to the tension of a bow-spring $e^2$, held by a collar which is keyed to the axle of the roller E. The pressure of this bow-spring against the surface of the spur-wheel may be varied at will by a hand-nut $e^3$, which screws down upon its center, and which may be set at any desired tension by a set-screw, so that in proportion to the pressure exercised by this bow-spring will be the resistance necessary to hold the roller E from revolving along with the spur-wheel $e$.

The spur-wheel gears with a worm $h$ on the upper end of a vertical shaft H, revolving in suitable bearings affixed to the side of the fork $4^a$. The lower end of this shaft carries a spur-wheel $h'$, meshing with a stationary spur-wheel $i$, bolted to the upper side of the cross-piece $2^a$, and surrounding the pivot which supports the stem. The meshing peripheries of these spur-wheels are broad enough to allow for the necessary vertical play caused by the change in position of the spur-wheel $h'$ necessarily incident to the rise and fall of the stem to which it is attached. As the forks revolve, accompanying the revolution of the stem, the spur-wheel $h'$ travels around the stationary spur-wheel $i$ and is caused by it to revolve. This revolution is communicated through the shaft H and worm $h$ to the spur-wheel $e$ and thence to the roller E, except so far as the latter slips notwithstanding the tension of the bow-spring. The roller F is carried immediately below and in contact with the roller E. As the stocking-tube is knit its lower end is carried under the companion roller F and around between the rollers E and F, thence over the roller E, and down to the winding-frame G. As these revolve a steady downward pull is exercised upon the stocking-tube, varied in accordance with the tension of the bow-spring $e^2$. Having passed around these rollers, the stocking-tube is free to fall down still farther, where it is wound upon the winding-arm G. It will be noted that this winding mechanism operates steadily during the revolution of the needle-cylinder, that is, while the complete tube is being formed, but is intermittent during the formation of the heel and toe pockets.

9. *The mechanism for automatically stopping the machine.*—When a complete stocking is finished, it is desirable when "transfer" work is being executed that the machine may be stopped in order that it may be possible to remove the needle-cylinder and replace it by another. This is effected by the central pattern-chain $86^b$. This pattern-chain contains a single elevated link, which when carried to the top of the drum lifts the rear end of the locking-lever $87^b$, which is intermediately pivoted to an arm projecting down from the lower surface of the bracket-plate 78, thereby removing the forward extremity of this lever from the annular groove in the slide-rod $88^b$, into which it is normally received. This slide-rod is carried by a slide bearing in the bearing-arm $89^b$ and its left-hand extremity rests against the side of the forward end of a clutch-lever 27. This clutch-lever is intermediately pivoted to an arm projecting from the left-hand end of the machine and engages at its rear end with the clutch-sleeve 26, sliding upon the main driving-shaft 22 of the machine. The left-hand end of this clutch-sleeve carries lugs 25, engaging, when the clutch-lever is in its normal position, as seen in Fig. 1, with lugs 24 upon the driving-pulley 23.

The connection between the clutch-lever 26 and the driving-pulley is not absolutely rigid, but is effected through the intervention of a doubly-forked friction-ring $26'$. The forks of this friction-ring engage the lugs 25 upon the sleeve, allowing them to slide horizontally therein, but forbidding independent revolution. The ring itself is received within an annular groove cut around a large shoulder formed around the driving-shaft, and is held therein by a tension which can be varied by means of screws which unite the two segmental portions of the ring. This tension is adjusted so that the pulley 23 will impart through the friction-ring sufficient force of revolution to drive the machine under the ordinary exigencies of operation, but should any of the parts become clogged the friction-ring will slip and prevent further injury to the machine. Accordingly, therefore, as the forward end of the clutch-lever 27, which is furnished with an appropriate handle, is thrown to the right or to the left will the machine be driven from the pulley 23 or will this pulley revolve idly upon its shaft. When the machine is initially set in motion by the throw of the clutch-lever 27 to the right by hand, the slide-rod 88$^b$ is set against the action of a strong spiral spring which surrounds it and presses at one end against the bearing-arm 89$^b$ and at the other against a collar surrounding the central portion of the slide-rod, and by means of the lever 87$^b$ falling into the annular groove in the slide-rod it is locked in place against the side of the depending bearing-arm 89$^b$. When the revolution of the pattern-chain 86$^b$ brings the elevated link to the top, which trips the lever 87$^b$, the spring shoots the slide-rod 88$^b$, pushing the clutch-lever 27 strongly to the left, thereby disengaging the sliding clutch 26 from the pulley and causing the revolution of the driving-shaft to cease. The number of links in the pattern-chain is so proportioned that this will occur after the formation of the predetermined number of rows of loops required to form the complete stocking.

Having thus described my invention, I claim—

1. In a circular-knitting machine, the combination of a stem; mechanism for imparting revolution thereto; a needle-cylinder resting upon the upper end of said stem and readily removable therefrom; a cam-cylinder surrounding said needle-cylinder and split vertically into two approximately equal portions; and mechanism for readily separating or uniting said portions, substantially as described.

2. In a circular-knitting machine, the combination of a needle-cylinder readily removable from its seat in the machine; a cam-cylinder surrounding said needle-cylinder and split vertically into two approximately equal portions; mechanism for readily separating or uniting said portions; and mechanism for imparting to said united portions motion relative to said needle-cylinder, substantially as described.

3. In a circular-knitting machine, the combination of a needle-cylinder; mechanism for imparting revolution thereto; a cam-cylinder surrounding said needle-cylinder composed of an upper portion containing needle-cams, which is split vertically into two approximately equal portions, and a lower base-ring to which the halves of the upper portion are hinged; lugs projecting from the unhinged sides of said split portions; and a yoke swiveled upon said base-ring which embraces said lugs when brought into juxtaposition and holds them together in a fixed position upon said base-ring, substantially as described.

4. In a circular-knitting machine, the combination of a stem; a needle-cylinder upon the upper end of said stem and removable therefrom; a spur-wheel upon the lower end of said stem; a cam-cylinder surrounding said needle-cylinder, composed of an upper portion containing needle-cams split vertically into two approximately equal portions, and a lower portion or base-ring; a spur-wheel upon said base-ring; a main driving-shaft having two sleeves; a sliding clutch upon said shaft engaging either of these sleeves; gearing whereby the revolution of one of these sleeves imparts revolution to the spur-wheel upon the stem; and gearing and connections whereby the revolution of the other of these sleeves imparts a motion of reciprocation to the spur-wheel upon the base-ring of the cam-cylinder, substantially as described.

5. In a circular-knitting machine, the combination of a needle-cylinder; a cam-cylinder surrounding the same; means for imparting a motion of reciprocation to said cam-cylinder; a cam-groove in the interior of said cam-cylinder interrupted by a cam; a vertical slide-rod on the exterior of said cam-cylinder in operative connection with said cam; a spring tending constantly to lower said slide-rod; and a projection on said slide-rod fitting into a corresponding recess and opposing said spring; and a rod-cam adapted to strike the lower end of said slide-rod and remove the projection from its recess, allowing said rod to be lowered by the spring, substantially as described.

6. In a circular-knitting machine, the combination of a needle-cylinder; a cam-cylinder surrounding the same; means for imparting a motion of reciprocation to said cam-cylinder; a cam-groove and one or more needle-cams on the interior of the cam-cylinder; rods carried by said cam-cylinder, whereby said needle-cams are actuated; a pair of sliding segments partially surrounding the needle-cylinder, and carrying rod-cams in position to be struck by the said rods so as to actuate the needle-cams; and means for moving said segments, so that their rod-cams strike the rods at different points of the traverse of the cam-cylinder, consisting in the case of each segment of a rack on the outer edge of said segment; a reciprocating pawling-bar with two opposing pawls; a tripping-cam between the two pawls; and mechanism whereby the cam-segment at the extremity of each traverse throws the tripping-cam, bringing one pawl into action and throwing the other out, substantially as described.

7. In a circular-knitting machine, the combination of a needle-cylinder, consisting of a contracted upper portion and an expanded lower portion; a cam-cylinder surrounding said needle-cylinder; a hollow stem, the upper portion of which extends through and fits closely but removably within the contracted upper portion of the needle-cylinder; a flange upon said stem upon the upper side of which the lower edge of the expanded portion of the needle-cylinder rests; and mechanism whereby the motion of revolution is imparted to said stem and with it to the removable needle-cylinder, substantially as described.

8. In a circular-knitting machine, the combination of a revoluble needle-cylinder; a cam-cylinder; and means for reciprocating the same; a main driving-shaft; sleeves upon said driving-shaft, the rotation of one of which effects the rotation of the needle-cylinder, and the rotation of the other of which effects the reciprocation of the cam-cylinder; a clutch whereby either sleeve is connected to said shaft; a lever whereby said clutch is thrown; slide-rods passing through and engaging opposite sides of said lever; springs whereby said slide-rods are shot; locking-levers holding said slide-rods against the action of the spring; a pattern-chain whereby one of said slide-rods is released so as to be shot throwing the lever so as to reciprocate the cam-cylinder; sliding cam-segments surrounding the said cam-cylinder; means for advancing and retracting the same during the reciprocation of the cam-cylinder; a lug on one of said segments; lever connections whereby at the end of its retraction said lug releases the other of said slide-rods so that it is thrown so as to rotate the needle-cylinder, substantially as described.

9. In a circular-knitting machine, the combination of a revoluble needle-cylinder; a cam-cylinder and means for reciprocating the same, and a thread-controlling mechanism consisting of a take-up lever through an eye in the extremity of which the thread passes, the said take-up lever being pivoted and swinging down against the pressure of a spring or counterweight; a vertical slide-rod; connections whereby the depression of the slide-rod holds the take-up lever in a fixed position, while its elevation renders it free to spring up under the influence of the spring or counterweight; and mechanism whereby the slide-rod is depressed during the rotation of the needle-cylinder and elevated during the reciprocation of the cam-cylinder, substantially as described.

10. In a circular-knitting machine, the combination of a revoluble needle-cylinder; a cam-cylinder and means for reciprocating the same, and a thread-controlling mechanism consisting of a pivoted tension-weight which when in its lower position rests upon the thread giving it a positive but not a prohibitory tension, and which when in its upper position leaves the thread entirely free; and mechanism whereby the said tension-weight is allowed to rest upon the thread during the reciprocation of the cam-cylinder, and is lifted during the rotation of the needle-cylinder, substantially as described.

11. In a circular-knitting machine, the combination of a revoluble needle-cylinder; a cam-cylinder and means for reciprocating the same, and a thread-controlling mechanism consisting of a take-up lever through an eye in the extremity of which the thread passes, the said take-up lever being pivoted and swinging down against the pressure of a spring or counterweight; a vertical slide-rod; a pivoted tension-weight which when in its lower position rests upon the thread giving it a positive but not a prohibitory tension, and which when in its upper position leaves the thread entirely free; connections whereby the depression of the slide-rod holds the take-up lever in a fixed position and lifts the tension-weight, while its elevation renders the take-up lever free to spring up under the influence of the spring or counterweight and lowers the tension-weight; and mechanism whereby the slide-rod is depressed during the rotation of the needle-cylinder and elevated during the reciprocation of the cam-cylinder, substantially as described.

12. In a circular-knitting machine, the combination of a revoluble needle-cylinder; a cam-cylinder and means for reciprocating the same, and a thread-carrying mechanism consisting of a fixed arm with eyes through which the main thread passes; a depending lever pivoted thereto having an eye at its extremity through which an auxiliary thread passes; a vertical slide-rod; a hole in said slide-rod through which the auxiliary thread passes; connections whereby when the slide-rod is in its upper position the auxiliary thread is free to pass through the hole in the slide-rod, and the depending pivoted lever thrown so as to bring the end of the auxiliary thread into proximity with the main thread, and whereby when the slide-rod is in its lower position the auxiliary thread is prevented from running through the hole in the slide-rod, while the end of the depending pivoted lever is removed from proximity with the main thread; and mechanism whereby the slide-rod is depressed during the rotation of the needle-cylinder and elevated during the reciprocation of the cam-cylinder, substantially as described.

ARTHUR WRIGHTSON.

Witnesses:
JAMES H. BELL,
E. REESE.